Dec. 5, 1961  J. KHACHIGIAN  3,011,185
DRILLING AND THREADING ATTACHMENT FOR LATHES AND THE LIKE
Filed Sept. 25, 1957
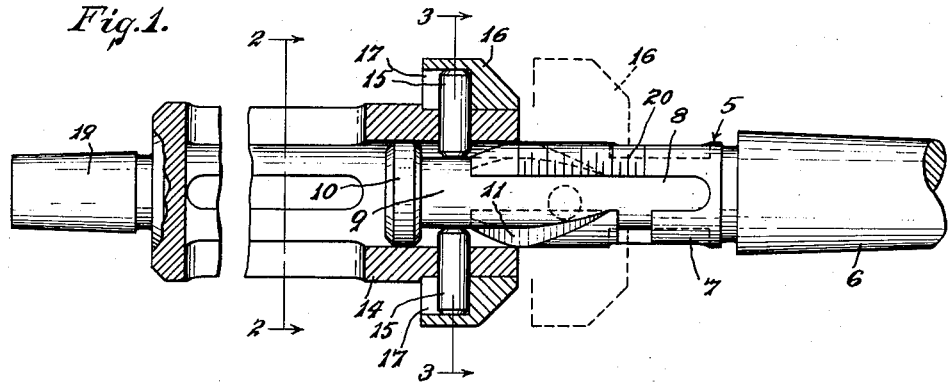
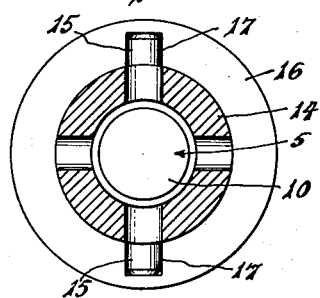 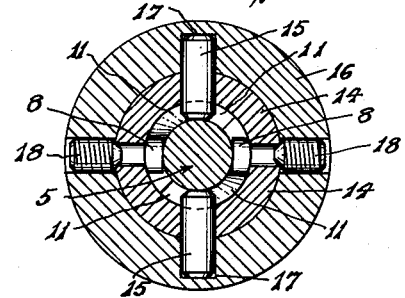
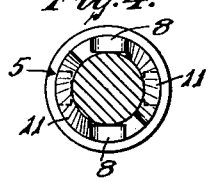 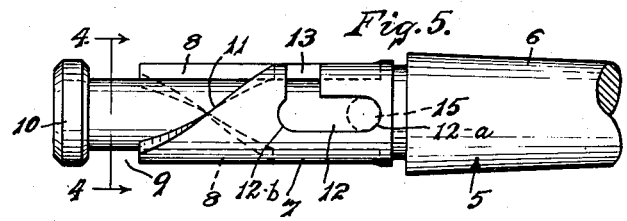
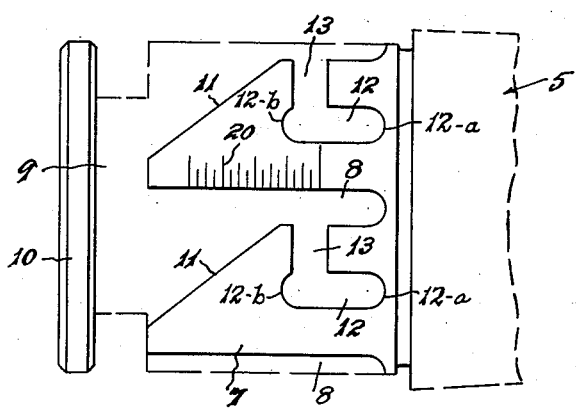
INVENTOR.
JOHN KHACHIGIAN.
BY *Louis V. Lucia*
ATTORNEY.

United States Patent Office 3,011,185
Patented Dec. 5, 1961

3,011,185
DRILLING AND THREADING ATTACHMENT FOR LATHES AND THE LIKE
John Khachigian, 42 Capitol Ave., Hartford, Conn.
Filed Sept. 25, 1957, Ser. No. 686,175
9 Claims. (Cl. 10—129)

This invention relates to a drilling and threading attachment for lathes and the like and more particularly to a device for use in lathes and similar machines for holding a tap, die or drill for use in drilling and threading a workpiece.

It is an object of this invention to provide an improved attachment which will greatly facilitate drilling and threading operations.

A further object of the invention is the provision of a device which can be mounted in the tail stock of a lathe or the like, or in the spindle of a similar machine, for supporting a chuck to which is attached a tap or die for threading operations, or a drill for drilling a hole in a workpiece prior to threading.

A further object of this invention is to provide such an attachment having means whereby it may be adjusted for threading a workpiece to a predetermined depth or distance.

Further objects and advantages of this invention will be more clearly understood from the following description and from the accompanying drawing in which:

FIG. 1 is an elevational view, partly in central vertical section, of a device embodying the present invention.

FIG. 2 is a sectional end view on line 2—2 of FIG. 1.

FIG. 3 is a similar view on line 3—3 of FIG. 1.

FIG. 4 is a sectional end view on line 4—4 of FIG. 5.

FIG. 5 is a bottom view of the spindle of the device shown in FIG. 1.

FIG. 6 is a diagrammatic view illustrating the peripheral surface of said spindle laid flat.

In the embodiment illustrated in the drawings, the numeral 5 denotes a spindle having a tapered shank 6 with a body portion 7 extending therefrom. The said body portion is formed to provide longitudinal grooves 8—8 in diametrically opposite sides thereof terminating in an annular groove 9 adjacent to a head portion 10 at the forward end of the body portion 7. The forward portions of the opposite sides of the grooves 8—8 (the bottom side of the front groove and the top side of the rear groove in FIG. 1) are helical, as shown at 11—11, and spiral toward the head end of the spindle for a purpose to be hereinafter described. Longitudinal grooves 12—12 are also provided in the opposite sides of the body portion 7 intermediate the grooves 8—8 and these grooves communicate with their respective grooves 8—8 through lateral connecting grooves 13—13.

A carrier member 14, in the form of a sleeve, is slidably and rotatably mounted on the body portion of the spindle and has a pair of diametrically opposed pins 15—15 projecting radially through the walls thereof which are adapted to be received in the grooves in said body portion. Said pins are retained in operative position in the carrier member 14 by means of a collar 16 having notches 17—17 which receive the outer ends of said pins and set screws 18—18 which secure said collar to the carrier member.

At the forward end of said carrier member, there is provided a tapered axial projection 19 which extends forwardly therefrom and is adapted to receive a conventional chuck or die holder.

The body portion 7 of the spindle is preferably graduated in fractions of an inch, as at 20, for the purpose to be hereinafter described.

In the use of the said device on a lathe, the shank portion 6 of the spindle is inserted into the tail stock of the lathe and a conventional chuck (not shown) is mounted upon the projection 19. When it is desired to drill a hole in a workpiece, a drill is mounted in the chuck and the carrier member 14 is then manually moved upon the body portion 7 of the spindle to pass the pins 15—15 through the grooves 8—8 and 13—13 and into the grooves 12—12, as indicated in dotted lines in FIG. 5, whereby the carrier member is prevented from rotating relatively to the spindle. The tail stock may then be advanced and the hole drilled in the workpiece in the conventional manner. During the drilling operation, the pins 15—15 will abut the upper ends 12-a of said slots 12—12 to force the drill into the work. Upon retracting the tail stock, the pins 15—15 will abut the forward ends 12-b of said slots 12—12 and thereby withdraw the drill from the workpiece.

It will be noted that said ends 12-b extend beyond the slots 13—13 and form a notch which aids in retaining the pins 15—15 in said slots 12—12 when the drill is being withdrawn from the workpiece.

In order to thread the hole in the workpiece, a tap is mounted in the chuck and my improved device is operated in the following manner:

The carrier member 14 is moved on the body portion 7 to locate the pins 15—15 in the grooves 8—8. The said carrier member is then moved rearwardly, as, for example, to the position shown in dotted lines in FIG. 1, to locate its rear end surface in alignment with the graduation 20 indicating the desired depth or length of thread. The tail stock is then moved toward the workpiece until the end of the tap is flush with the end of the hole in the workpiece. The tail stock is then locked in this position and the tap is started into the hole in the rotating workpiece by manually pushing the carrier member axially on the spindle in the direction of the workpiece. When the tap starts to cut, the carrier member 14 will be pulled endwise on the spindle and will also tend to rotate in the same direction as the workpiece. This will thrust the pins 15—15 against the helical surfaces of the grooves 8—8 and cause the carrier member to be forced forwardly on the spindle 5 and thereby greatly reduce the objectionable pull on the tap which would result from friction between the pins 15—15 and the sides of the grooves 8—8 if such grooves were straight.

When the workpiece is threaded for the full predetermined distance, the pins 15—15 will ride off the forward ends of said helical surfaces into the annular groove 9, whereupon the carrier member 14 will rotate freely with the workpiece and the threading operation is then terminated.

To withdraw the tap, the workpiece is rotated in the opposite direction and the spindle 5 is moved forwardly by operation of the tail stock until the pins 15—15 engage the straight sides of the grooves 8—8 and thereby hold the carrier member 14 against rotation. As the tap moves axially out of the threaded hole, the carrier member will be guided for axial sliding movement along the spindle by engagement of the pins 15—15 with the straight sides of the grooves 8—8.

I claim:

1. An attachment for lathes and the like including a spindle having a body portion, the said body portion having a pair of opposed longitudinal grooves therein, a head portion, an annular groove between said head portion and the ends of said longitudinal grooves, a carrier member slidable and rotatable on the body portion of said spindle over said grooves therein, pins projecting from the carrier member into said grooves, means for mounting a chuck upon said carrier member, the sides of said longitudinal grooves in the direction of thrust between said pins and the sides of said longitudinal grooves being spiralled toward the forward end of the spindle to thereby urge the said carrier member in the direction of a workpiece under the influence of thrust between said pins and said spiralled sides.

2. An attachment of the character described including a spindle having a body portion, the said body portion having longitudinal grooves in the opposite sides thereof and an annular groove at the ends of and communicating with said longitudinal grooves, a carrier member slidable and rotatable on said body portion over said grooves, pins secured to the carrier member and projecting into said grooves, detachable means retaining said pins upon the carrier member, the said longitudinal grooves having sides thereof spiralled in the direction of rotation of a workpiece relatively to the spindle whereby, upon the said pins being thrust against said spiralled sides by rotation of the carrier member relatively to the spindle, the said carrier member will be urged forwardly on said body portion of the spindle and, upon the said pins being moved past the ends of said spiralled sides, they will enter the annular groove and thereby permit rotation of the carrier member with the workpiece.

3. An attachment as set forth in claim 2 wherein the detachable means include a ring fitting over the carrier member and the pins therein and detachably secured to said carrier member.

4. An attachment as set forth in claim 2 wherein the longitudinal grooves have one side thereof straight and engageable with said pins upon relative rotation in reverse direction between the carrier member and the spindle.

5. An attachment as set forth in claim 4 including means for indicating the distance of travel of said carrier member relatively to the spindle.

6. An attachment for lathes and the like including a body portion, the said body portion having an elongated longitudinal groove therein, a head portion, an annular groove between said head portion and the end of said longitudinal groove, a carrier member slidable and rotatable on said body portion, and a pin projecting from said carrier member into said grooves; the said longitudinal groove having a side thereof spiralled toward the front end of the spindle and in the direction of rotational force applied to the carrier member whereby the said carrier member will be urged toward said front end under the influence of said force.

7. In an attachment of the character described including a spindle having a body portion with a longitudinal groove in the side thereof and an annular groove at the end of said body portion communicating with said longitudinal groove, the said longitudinal groove having a straight side and a side spiralled in the direction of rotation of a workpiece, a carrier member slidable and rotatable on said body portion over said grooves, and a pin secured to said carrier member and projecting therefrom into said grooves; the improvement wherein said body portion is provided with an intermediate longitudinal groove spaced from and unconnected with said annular groove, and a connecting groove extending between said longitudinal and intermediate grooves, said pin being movable from said longitudinal groove into said intermediate groove through said connecting groove to permit selective positioning of said carrier member in predetermined positions on said spindle body.

8. In an attachment for lathes and the like including a spindle having a pair of longitudinal grooves therein at opposite sides thereof spiralled in the direction of rotation of a workpiece and an annular groove adjacent the end of said spindle communicating with said longitudinal grooves, a carrier member slidable and rotatable on said spindle over said grooves, and pins secured to said carrier member and projecting therefrom into said grooves; the improvement wherein said spindle is provided with intermediate grooves disposed parallel to and between said longitudinal grooves and spaced from and unconnected with said annular groove, and lateral connecting grooves each connecting one of said longitudinal grooves with one of said intermediate grooves, said pins being movable from said longitudinal grooves into said intermediate grooves through said connecting grooves to thereby permit selective positioning of said carrier member in predetermined positions on said spindle.

9. An attachment as set forth in claim 8 wherein said intermediate grooves extend rearwardly of the lateral grooves and their forward ends terminate in notches adjacent to said lateral groove.

References Cited in the file of this patent

UNITED STATES PATENTS

| | | |
|---|---|---|
| Re. 12,269 | Hunter | Sept. 20, 1904 |
| 2,340,477 | Kruse | Feb. 1, 1944 |
| 2,383,991 | Sarossy | Sept. 4, 1945 |
| 2,390,792 | Jesperson | Dec. 11, 1945 |
| 2,881,454 | Moneymaker | Apr. 14, 1959 |